(12) United States Patent
Goodwin

(10) Patent No.: US 6,283,628 B1
(45) Date of Patent: Sep. 4, 2001

(54) INTELLIGENT INPUT/OUTPUT TEMPERATURE SENSOR AND CALIBRATION METHOD THEREFOR

(75) Inventor: Shaun Goodwin, Hurlock, MD (US)

(73) Assignee: Airpax Corporation, LLC, Frederick, MD (US)

( * ) Notice: Subject to any disclaimer, the term of this patent is extended or adjusted under 35 U.S.C. 154(b) by 0 days.

(21) Appl. No.: 09/151,305

(22) Filed: Sep. 11, 1998

(51) Int. Cl.[7] .............................. G01K 15/00; G01K 7/16; G01K 7/00
(52) U.S. Cl. ................................ 374/1; 374/169; 374/183
(58) Field of Search ............................ 374/1, 170, 169, 374/183; 327/512

(56) References Cited

U.S. PATENT DOCUMENTS

| | | | |
|---|---|---|---|
| 4,648,055 | * | 3/1987 | Ishizaka et al. ................ 374/170 |
| 4,877,333 | * | 10/1989 | Ota et al. ...................... 374/169 |
| 4,878,184 | * | 10/1989 | Okada et al. ................... 364/557 |
| 5,001,657 | * | 3/1991 | Yagura et al. .................. 364/557 |
| 5,379,230 | * | 1/1995 | Morikawa et al. ............... 327/512 |
| 5,425,375 | * | 6/1995 | Chin et al. ..................... 374/208 |
| 5,473,629 | * | 12/1995 | Muramoto ...................... 374/169 |
| 5,524,213 | * | 6/1996 | Dais et al. ..................... 395/200.17 |
| 5,619,430 | * | 4/1997 | Nolan et al. .................... 364/557 |
| 5,653,239 | * | 8/1997 | Pompei et al. .................. 128/664 |
| 5,876,122 | * | 3/1999 | Eryurek ......................... 374/183 |
| 5,901,323 | * | 5/1999 | Milliken et al. ................ 395/800.01 |

OTHER PUBLICATIONS

Dallas Semiconductor. DS75 2_wire Thermal Watchdog. Product Announcement. pp. 1–13.*

* cited by examiner

*Primary Examiner*—Diego Gutierrez
*Assistant Examiner*—Gail Verbitsky
(74) *Attorney, Agent, or Firm*—Milde, Hoffberg & Macklin, LLP

(57) ABSTRACT

An intelligent input/output (I/O) temperature sensor includes a temperature sensing element which generates a plurality of digital data indicative of the temperature at the temperature sensing element, a processor directly coupled to the temperature sensing element which generates a plurality of compensated digital data from respective the digital data and a digital delta value, and a memory directly coupled to the processor which stores the digital delta value and the compensated digital data. According to one aspect of the invention, the memory is an electrically erasable programmable read only memory (EEPROM). According to another aspect of the invention, the memory, the temperature sensing element and the processor are all disposed within a unified structure, i.e., on a single chip. A method for calibrating an intelligent input/output (I/O) temperature sensor is also described.

3 Claims, 3 Drawing Sheets

INTELLIGENT INPUT/OUTPUT TEMPERATURE SENSOR AND CALIBRATION METHOD THEREFOR

BACKGROUND OF THE INVENTION

The present invention relates generally to temperature sensors. More specifically, the present invention relates to intelligent input/output (I/O) temperature sensors. Advantageously, a corresponding method for calibrating the intelligent I/O temperature sensors is also disclosed.

Numerous devices for remotely sensing temperatures, particularly temperatures reflecting the operational parameters of various machines and machine systems have been produced. In recent years, numerous programmable temperature sensors have become available. For example, U.S. Pat. No. 5,781,075 to Bolton, Jr. et al., which is entitled "Temperature Sensing Apparatus," discloses a programmable temperature sensor supplied with both a biasing current and a voltage from a temperature independent voltage source. In this apparatus, the output voltage generated by the voltage source is programmable; thus, the output of the temperature sensor can be adjusted by programming the output voltage of the temperature independent voltage source. It will be appreciated that temperature sensors utilizing the patented circuit exhibit a significant part count, particularly when it is desirable to output the temperature data in digital form. The latter would require at least an analog-to-digital converter (ADC), since the patented circuit generates an analog output. U.S. Pat. Nos. 5,241,850 and 5,519,354 disclose alternative circuitry for programming the temperature range of a temperature sensor; this circuitry also suffers from the same problems.

When installed in a temperature sensing system where the temperature has to sensed from a plurality of locations, it is often expedient to compensate all of the sensors, not individually at the sensor location but at the controller of the temperature sensing system. This requires not only the storage of temperature compensation data for each sensor at the controller but that the controller dedicate a significant portion of its processing time to correcting temperature data gathered by the temperature sensing system.

U.S. Pat. No. 5,444,637 to Smesny et al., which is entitled "Programmable Semiconductor Wafer For Sensing, Recording and Retrieving Fabrication Process Conditions To Which The Wafer Is Exposed," discloses a programmable semiconductor wafer device 10, which, as illustrated in FIG. 1, includes numerous circuits formed upon its surface topography to sense, store and retrieve processing conditions exerted upon the wafer. Circuits include sensors 12 placed within select regions 14 configured across the surface of wafer 10. Each region 14 includes at least one sensor 12 and preferably many sensors capable of reading one or numerous processing conditions. A sensor within each region is con-figured to detect a single processing condition. If more than one sensor is formed within each region, then numerous processing conditions can be detected based upon the number of sensors so formed. Sensors 12 reads, stores and retrieves one or many processing conditions registered within each region 14 and across the semiconductor wafer. Regions 14 are disposed substantially equi-distant from one another across the entire wafer surface in order to obtain an accurate gradient reading thereon. In FIG. 1, four sensors 12 are placed within each of seven regions 14.

Placed between select regions 14 is a semiconductor power device 16, i.e., either photoelectronic conversion device or a direct electrical storage device using conventional capacitor arrays or a thin film lithium battery. Placed between select regions 14 and spaced from power supply 16 is a signal acquisition/conditioning circuit 18 and a processor 20 containing read only as well as read/write memory. Acquisition/conditioning circuit 18 is connected between processor 20 and each sensor 12 contained within each region 14. Circuit 18 provides a data-conversion function, while processor 20 contains digital components which perform computer and/or peripheral interfacing tasks. Acquisition/conditioning circuit 18 includes circuitry necessary to accommodate the input or sensor voltage of each sensor 12 into a digital signal acceptable for processor 20. To transform the analog signal from each sensor 12 to a digital data stream acceptable by processor 20, a multiplex circuit as well as an A/D converter and amplifier is needed as part of circuit 18. Furthermore, to increase the speed at which the information can be accurately converted, a S/H circuit may also be used as part of circuit 18 to compress analog signal information.

Coupled to acquisition/conditioning circuit 18, as well as processor 20, is an external control circuit 22 which can be arranged in one or more locations between regions 14 as would be necessary to maximize the use of semiconductor real estate. External control circuit 22 is capable of receiving programmable input from an external device and, based upon that input, provide timing pulses, enables, etc., to circuit 18 as well as processor 20. Input indicia into external control circuit 22 is provided via an input probe pad 24. Pad 24 is a conductive, substantially planar structure connected to the input of circuit 22 similar to a bonding pad arrangement normally associated with the periphery of an integrated circuit die. Pad 24 is of sufficient size to allow repeated mechanical alignment and contact with an external probe source. Probe pad 24 allows data to be input into circuit 22 necessary for programming and reprogramming of processor 20. Wafer 10 also includes an output probe pad 26, which is configured similar to input probe pad 24 for allowing mechanical access from an external output device necessary for receiving digital information stored within the read/write memory of processor 20.

The wafer sensor system described immediately above suffers from both of the problems discussed above. First, the system has an unacceptably high part count, by virtue of such elements as the multiplexer, signal conditioning filters and ADCs. Moreover, the processor receives raw data from the sensors, in spite of the fact that the data signals are conditioned a number of times on their way between the sensors and the processor. It will be noted that the data storage associated with the system comprises a central data store.

What is needed is a stand alone temperature sensor that provides both accuracy and linearity compensation. Moreover, what is needed is a stand alone temperature sensor providing storage of historical data, where the storage device is some form of non-volatile memory. Furthermore, what is needed is a stand alone temperature sensor which can be easily linked with a plurality of other stand alone temperature sensors via a serial bus to form a temperature sensor system. Lastly, it would be advantageous to have a temperature sensing system wherein each of the stand alone temperature sensors can be re-programmed over the aforementioned serial bus.

SUMMARY OF THE INVENTION

Based on the above and foregoing, it can be appreciated that there presently exists a need in the art for a stand alone temperature sensor and system incorporating same which overcomes the above-described deficiencies. The present invention was motivated by a desire to overcome the drawbacks and shortcomings of the presently available technology, and thereby fulfill this need in the art.

One object of the present invention is to provide a stand alone temperature sensor having both accuracy and compensation.

Another object according to the present invention is to produce a stand alone temperature sensor capable of storing temperature compensated historical data for subsequent downloading.

Still another object according to the present invention is provide a stand alone temperature sensor for storing temperature compensate historical data in a non-volatile memory.

Yet another object according to the present invention is to provide a stand alone temperature sensor which can be calibrated during fabrication.

Another object according to the present invention is to provide a plurality of stand alone temperature sensors which can be linked to one another to form a temperature sensor network.

An object according to the present invention is to provide a plurality of stand alone temperature sensors which can be linked to one another via a serial bus to form a temperature sensor network.

Another object according to the present invention is to provide a plurality of stand alone temperature sensors which can be linked to one another via a serial bus to form a field programmable temperature sensor network.

These and other objects, features and advantages according to the present invention are provided by an intelligent input/output (I/O) temperature sensor, including a temperature sensing element which generates a plurality of digital data indicative of the temperature at the temperature sensing element, a processor directly coupled to the temperature sensing element which generates a plurality of compensated digital data from respective the digital data and a digital delta value, and a memory directly coupled to the processor which stores the digital delta value and the compensated digital data. According to one aspect of the present invention, the memory is an electrically erasable programmable read only memory (EEPROM). According to another aspect of the invention, the memory, the temperature sensing element and the processor are all disposed within a unified structure, i.e., on a single chip.

These and other objects, features and advantages according to the present invention are provided by an intelligent input/output (I/O) temperature sensor, includes a temperature sensing device for repeatedly sensing the temperature proximate to the temperature sensing means and generating a plurality of digital data indicative of the temperature, a processing device directly coupled to the temperature sensing device for arithmetically combining respectively the digital data and a digital delta value to thereby generate a plurality of compensated digital data, and a memory device directly coupled to the processing device for storing the digital delta value and the compensated digital data.

These and other objects, features and advantages according to the present invention are provided by a temperature sensing system, including a plurality of temperature sensors and a serial bus for connecting the temperature sensors together in a multi-master configuration. Preferably, each of the temperature sensors is configured as described immediately above.

These and other objects, features and advantages according to the present invention are provided by a method for calibrating an intelligent input/output (I/O) temperature sensor, the temperature sensor having a temperature sensing element which generates a plurality of digital data indicative of the temperature at the temperature sensing element, a processor directly coupled to the temperature sensing element which generates a plurality of compensated digital data from respective the digital data and a digital delta value, and a memory directly coupled to the processor which stores the digital delta value and the compensated digital data, operatively coupled to a programming device. Advantageously, the method includes steps for determining actual temperature first digital data indicative of the actual temperature of the temperature sensor, reading uncompensated temperature second digital data from the temperature sensing element, calculating the digital delta value corresponding to the difference between the first and second digital data, and storing the digital delta value in the memory for subsequent use by the processor. The calculating step is performed by the programming device.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

A stand alone temperature sensor according to the present invention will now be described while referring to FIG. 2, wherein a temperature sensor 100 includes a central processing unit (CPU) 102 connected to both a temperature sensing element 104 and a memory 106. Preferably, the memory 106 is a non-volatile memory and, most preferably, memory 106 is an electrically erasable programmable read only memory (EEPROM). It will be appreciated that a power supply (not shown) is connected to provide power to all of the components within temperature sensor 100.

Figure 1:
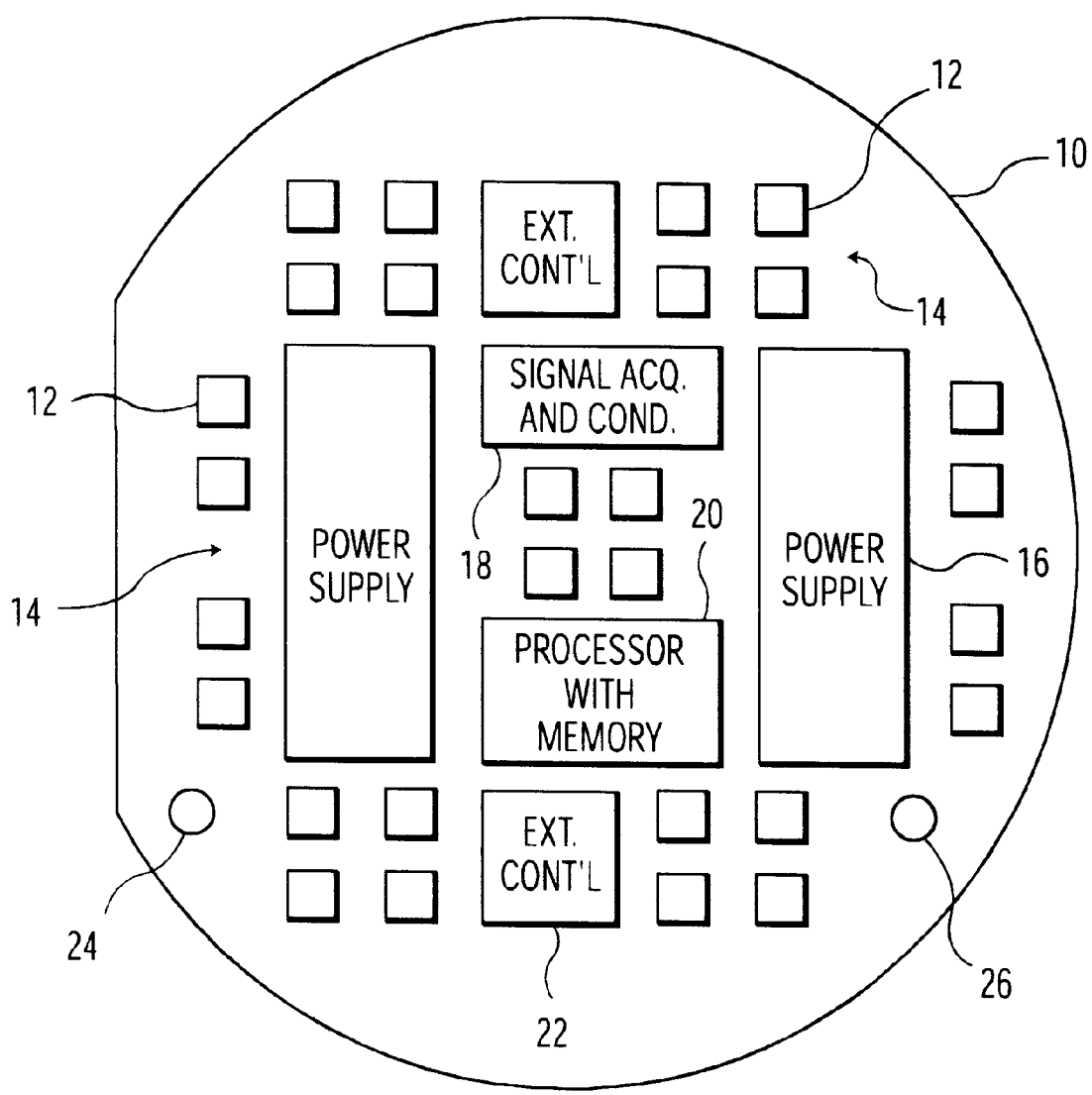
FIG. 1 illustrate a conventional temperature sensing system.
Figure 2:
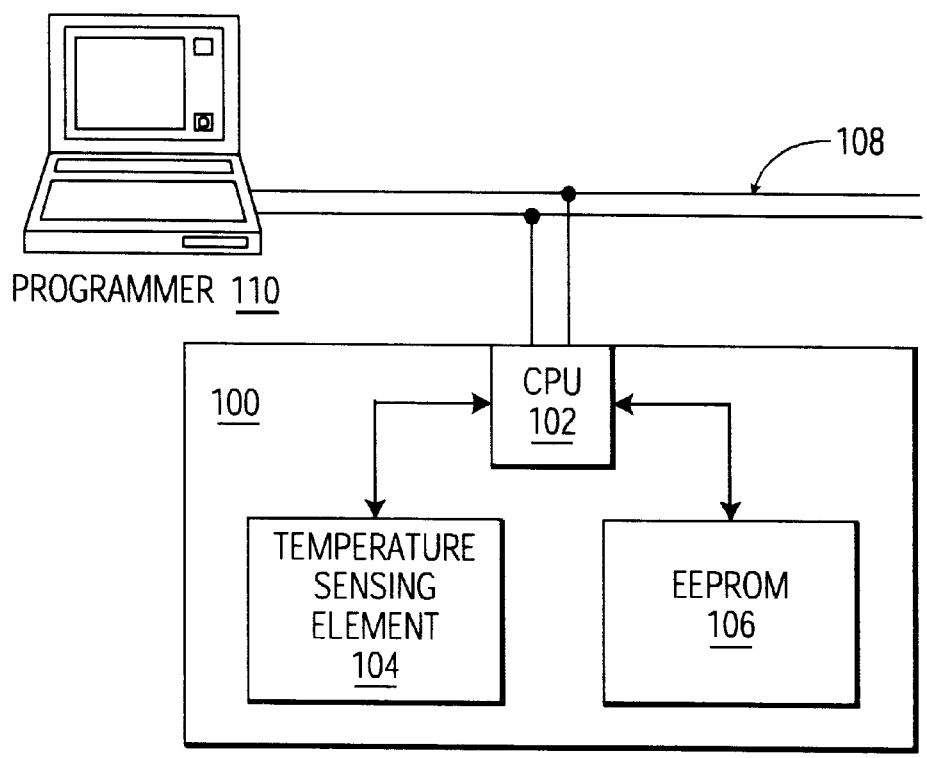
FIG. 2 is a high level block diagram of a temperature sensor and associated programming device according to the present invention.

In a specific implementation of the preferred embodiment illustrated in FIG. 2, the temperature sensing element 104 comprises a temperature sensing element having a digital output. Several devices, such as the DS75 2-wire thermal watchdog device manufactured by Dallas Semiconductor, having this output characteristic have recently been made commercially available. It should be noted that although such devices are programmable, one of the programmed functions is not temperature compensation. In the exemplary embodiment illustrated in FIG. 2, the CPU 102 advantageously can be a National Semiconductor programmable controller such as Model No. COP8SAC7 while the memory advantageously can be a Model No. MN93C86 EEPROM manufactured by Fairchild Semiconductor. It should be clearly understood that the present invention is in no way limited by the discrete elements used in a fabricating a working example of the preferred embodiment illustrated in FIG. 2. Any and all combinations of discrete elements capable of performing the functions and acts described herein are considered to fall within the scope of the present invention. Moreover, the present invention is in no way limited to discrete elements; it is presently contemplated that the temperature sensing element 104, the CPU 102 and the memory 106 advantageously can all be formed on a single substrate; such a unified structure is also considered to be with the scope of the present invention. Moreover, any and all variants falling between these two extremes is considered within the scope of the present invention.

The temperature sensor 100 advantageously can be connected to the a programmer 110, e.g., an automatic or semi-automatic device such a computer, via bus 108. Preferably the bus 108 comprises a serial bus and, most preferably, the bus 108 is a I$^2$C two wire serial bus. It will be appreciated that the I$^2$C bus is a bi-directional bus carrying serial data SDA and a serial clock SCL, which permits several devices to be connected to one another in a multi-master configuration. The CPU 102 communicates though I/O port 111 with the I$^2$C bus 108. It should also be noted that although the programmer 110 is depicted as a laptop computer, the programmer is not so limited. The programmer advantageously can be any device capable of transferring instructions and receiving data to and from the temperature sensor 100 via the bus 108.

Figure 3:
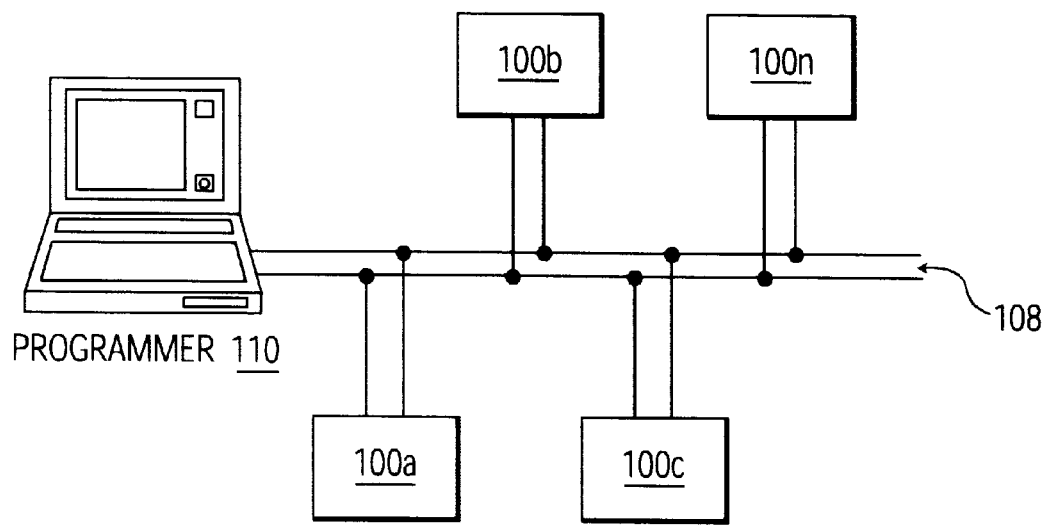
FIG. 3 is a high level block diagram of a temperature sensing system employing a plurality if the temperature sensors illustrated in FIG. 2.

Referring to FIG. 3, another preferred embodiment according to the present invention comprises a temperature sensing system 200, which advantageously comprises a plurality of temperature sensors, i.e., temperature sensors 100$a$, 10$b$, 100$c$, . . . , 100$n$, where n is a positive integer. As mentioned above, the temperature sensing element 104 can be a DS75 watchdog element, which element can be programmed with a specific address. In any event, suffice it to say that each of the individual temperature sensors can be selected one at a time for programming, if necessary, and for periodic polling by a remote device, which in an exemplary case can be the controller 110, to download stored corrected temperature data.

The calibration of the temperature sensor 100 will now be described while referring to FIG. 4, which is a high level flow diagram of the calibration, i.e., temperature compensation, process according to the present invention. During the start of process at step 300, both the temperature sensor 100 and the programmer 110 are initialized. It should also be mentioned that a high accuracy temperature sensing device is connected to the temperature sensor 100 so that the actual ambient temperature at temperature sensor 100 advantageously can be determined and used in the calibration process. More specifically, during step 302, the programmer 10 determines the actual temperature TA of the temperature sensor 100 and then, during step 304, the programmer 110 reads raw temperature TR data from the CPU 102 via the bus 108.

During step 306, the programmer 110 determines whether or not the values TR and TA are equal to one another. When the answer is affirmative, the program steps to step 308 and ends. However, when the answer is negative, indicating that the values TA and TR are different, steps 310 through 326 are performed to program the CPU 102 to compensate the raw temperature data TR to thereby produce compensated temperature TC data, which advantageously can be one of stored in memory 106 and output over bus 108.

During step 310, the programmer 110 determines the temperature delta TD, i.e., difference, from the TA and TR data values and stores the TD value in memory 106 during step 312. The programmer 110 then re-reads the temperature TA of the temperature sensor 100 during step 314 while the CPU 102 reads the TR value from the temperature sensing element 104 during step 316. During step 318, the CPU 102 loads the TR data to a register (not shown) employed in performing calculations and, during step 320, the CPU 102 fetches the TD value from the memory 106 and adds/subtracts the TD value from the TR value to thereby generate the TC data at step 322. During step 324, the newly generated TC data value is transmitted to the programmer 110 via the bus 108, and during step 326 the programmer confirms that the values TA and TC are equal to one another. The program then steps back to step 308 and ends.

Figure 4:
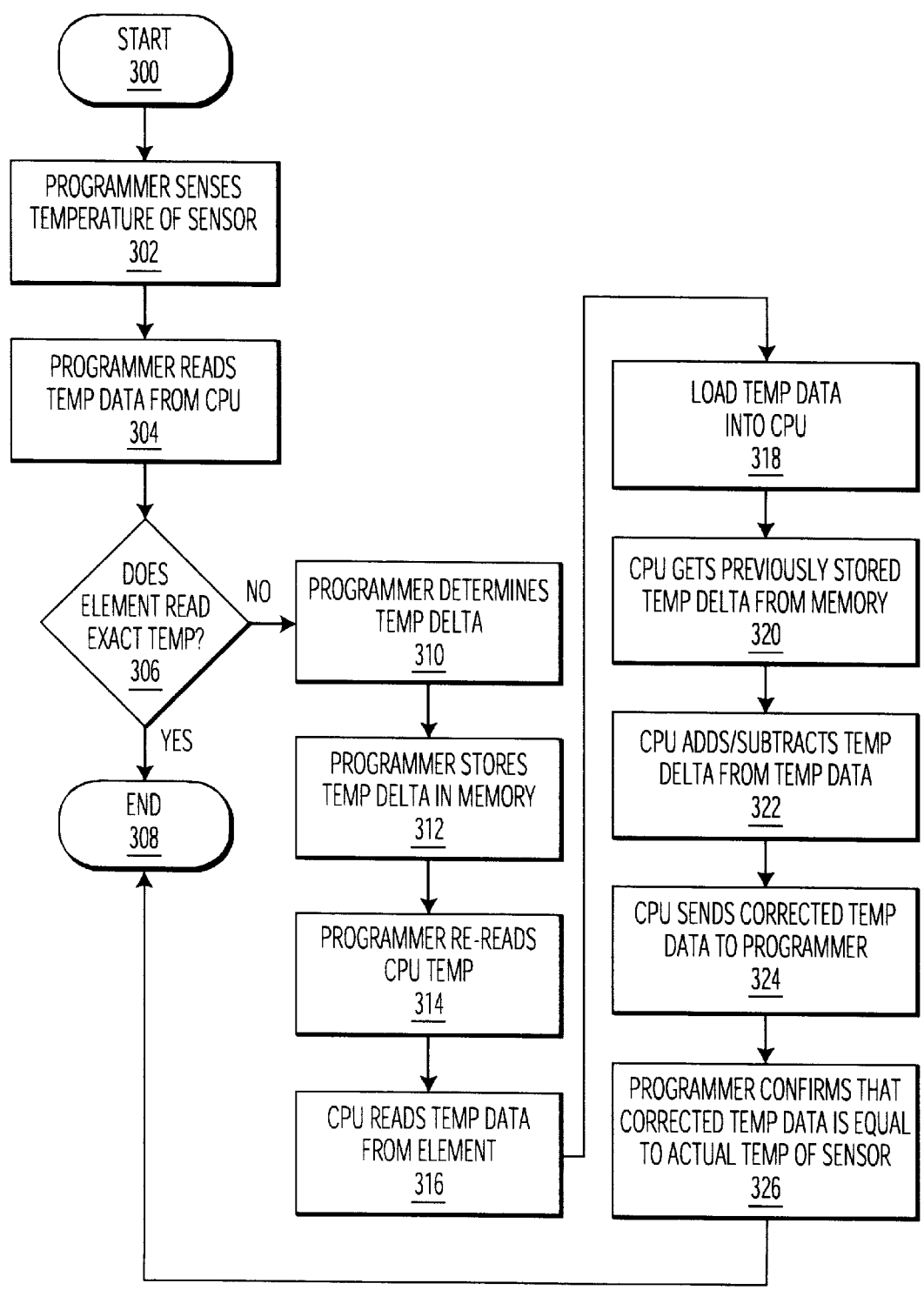
FIG. 4 is a flowchart illustrating the calibration process for the temperature sensor illustrated in FIG. 2.

It should be mentioned that the calibration routine discussed with respect to FIG. 4 can be enhanced in a number of ways without departing from the scope of the present invention. For example, another decision block can be added after or in place of step 326 to verify that TC and TA values are equal to one another. If the answer is negative, the temperature sensor 100 is flagged as defective. It should also be mentioned that the calibration procedure is non-specific in the sense that the same procedure advantageously can be used either in the fabrication facility or in the field to calibrate the device.

Moreover, it should be noted that the temperature sensing element 104, for example, can be programmed in a number of ways to enhance its performance. For example, the accuracy of the temperature sensing element 104 can be varied from X bits to X+Y bits. One of ordinary skill in the art will immediately appreciate that for a given size of memory 106, the amount if data TC stored in the memory decreases as the accuracy increases.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method for calibrating an intelligent input/output (I/O) temperature sensor, the temperature sensor having a temperature sensing element which generates a plurality of digital data samples indicative of the temperature proximate to the temperature sensing element; a digital processor directly coupled to said temperature sensing element which generates a plurality of compensated digital data from said samples and a digital compensation value; a rewritable memory directly coupled to said processor which persistently stores, in updatable fashion, said digital compensation value and data representing the plurality of digital data samples, operatively coupled to a programming device; and a multi-master communication interface for communicating said digital data and at least one instruction for the digital processor with a communication bus of a sensor network, wherein said temperature sensing element, said digital processor and said memory are formed on a single substrate, said method comprising the steps of:

determining an actual temperature first digital data indicative of an actual temperature measured by the temperature sensor;

reading uncompensated temperature second digital data from said temperature sensing element;

calculating the digital compensation value based on said first and second digital data;

storing said digital compensation value in said memory for subsequent use by said digital processor;

storing data representing a plurality of digital historical temperature data samples in said memory; and communicating said digital data and information defining the digital compensation value through the multi-master communication interface and the sensor network with said programming device.

2. The method as recited in claim 1, wherein said memory comprises an electrically erasable programmable read only memory (EEPROM), and wherein said storing step comprises storing said digital compensation value in said EEPROM for subsequent use by said processor in generating the compensated digital data.

3. The method as recited in claim 1, wherein said calculating step is performed by said programming device.

\* \* \* \* \*